United States Patent
Liet (10) Patent No.: US 7,938,575 B2
(45) Date of Patent: May 10, 2011

(54) FOOD MIXER WITH FLOW GUIDING BODY

(75) Inventor: Cornelis Hendricus Liet, Losser (NL)

(73) Assignee: Trioliet Mullos B.V.8, BE Oldenzaal (NL)

( * ) Notice: Subject to any disclaimer, the term of this patent is extended or adjusted under 35 U.S.C. 154(b) by 84 days.

(21) Appl. No.: 12/435,704

(22) Filed: May 5, 2009

(65) Prior Publication Data

US 2009/0277340 A1    Nov. 12, 2009

(30) Foreign Application Priority Data

May 6, 2008   (DE) .................... 20 2008 006 184 U
Feb. 2, 2009  (EP) ..................................... 09001394

(51) Int. Cl.
    B01F 7/24         (2006.01)
(52) U.S. Cl. .... 366/314; 366/319; 366/603; 241/101.76
(58) Field of Classification Search ................. 366/302, 366/306, 307, 314, 318–324, 603; 241/101.76, 241/101.761, 101.8, 260.1, 605
See application file for complete search history.

(56) References Cited

U.S. PATENT DOCUMENTS

| | | | | |
|---|---|---|---|---|
| 5,456,416 A | * | 10/1995 | Hartwig | ..................... 241/260.1 |
| 5,601,362 A | | 2/1997 | Schuler | |
| 5,615,839 A | * | 4/1997 | Hartwig | ..................... 241/260.1 |
| 5,647,665 A | * | 7/1997 | Schuler | ......................... 366/196 |
| 7,347,615 B2 | | 3/2008 | van der Plas et al. | |
| 7,507,016 B2 | * | 3/2009 | Huberdeau et al. | .......... 366/314 |
| 2007/0274151 A1 | | 11/2007 | Albright | |
| 2008/0101154 A1 | * | 5/2008 | Huberdeau et al. | ............. 366/65 |
| 2009/0277340 A1 | * | 11/2009 | Liet | ................................ 99/485 |

FOREIGN PATENT DOCUMENTS

| | | |
|---|---|---|
| EP | 1481721 | 12/2004 |
| EP | 1481721 A2 * | 12/2004 |
| EP | 2119345 A1 * | 11/2009 |

* cited by examiner

Primary Examiner — Charles E Cooley
(74) Attorney, Agent, or Firm — Fish & Richardson P.C.

(57) ABSTRACT

A food mixer (1) with a container (3) with side walls (3a) and a bottom (3) is described. The food mixer (1) contains a mixing screw (5) rotating about an axis (5') extending essentially perpendicularly to the bottom (3b). A support surface (7d) is assigned to the mixing screw and strokes over the bottom (3b) with a leading edge (7a), a flow guiding body (8, 108, 208, 308, 408) projecting upwards from the support surface (7d). To improve and facilitate in a constructionally simple manner a measuring out process, it is suggested to provide the flow guiding body (8, 108, 208, 308, 408) with a guiding surface (10, 210, 310) essentially facing radially outwards which is provided with a point (9) directed to the leading edge (7a) and resting on the support surface (7d) and extends with an increasing height (h) above the support surface (7d) backwards in the sense of rotation (D).

14 Claims, 8 Drawing Sheets

FOOD MIXER WITH FLOW GUIDING BODY

BACKGROUND OF THE INVENTION

This invention relates to a food mixer of the type having a container with a side wall and a bottom, a mixing screw rotating about an axis extending essentially perpendicular to the bottom, and with a support surface assigned to the mixing screw that strokes over the bottom with a leading edge and from which a flow guiding body projects upwards.

Such a food mixer is known from U.S. Pat. No. 5,456,416. The known food mixer is designed as food mixing vehicle and comprises a container with a mixing screw disposed therein and rotated about an essentially vertical axis. The diameter of the mixing screw is over the mainly axial height essentially smaller than the diameter of the bottom and, the mixing screw is provided with cutter elements at its periphery. Only the first channel of the mixing screw above the bottom is extremely broadened following the leading edge of the mixing screw, so that the leading edge and about a quarter of the complete angular separation of the first channel of the screw strokes over the complete bottom. The region behind the leading edge is thus designed as collection plate onto which the food guided upwards and discharged at the top by the mixing screw will fall and can be thrown off. On this collection plate, a flow guiding body is arranged which contains a guiding surface inclined backwards in the direction of the axis of revolution, of which the base edge extending on the collection plate includes an acute angle with the leading edge and extends essentially into the same direction as the leading edge, wherein the radially outer area of the guiding surface is leading in the sense of rotation with respect to the radially inner area of the guiding surface. The purpose of this guiding surface is to guide the food towards the mixing screw to facilitate mixing.

Mixing containers, in particular the food mixing vehicles discussed herein, comprise a discharge opening disposed near the bottom through which the material must be pressed out of the mixing container. For optimally mixing the food, however, an operating mode of the mixing screw where the food collecting at the bottom is taken up by the leading edge and transported upwards by the mixing screw proved to be convenient. At the upper area of the mixing screw, the food is released and falls down again towards the bottom. Thereby, a downward flow is formed near the container walls and thereby also above the door. This downward flow must be interrupted by the discharged material to ensure the discharge of the material. This is often not easy, in particular in case of very dry, long-fiber feeding stuff, as for example hay.

The object underlying the invention therefore is to provide a food mixer with an improved discharge of the food.

The object is achieved with a food mixer according to the present invention.

SUMMARY OF THE INVENTION

The embodiment according to the invention provides a guiding surface with which the food can be better pressed through the discharge opening without disturbing the flow of material towards the mixing screw more than necessary.

Advantageously, the guiding surface is inclined to such an extent that its distance to the axis is smallest at the point. Thereby, a firm smooth change of direction of the food towards the discharge opening is achieved.

The arrangement of the guiding surface, essentially oriented to the center of the leading edge, proved to be a good compromise between the amounts of food to be discharged and the amounts still remaining in the mixing process. Moreover, thus an adequate distance to the container walls is created, at least in the front area of the flow guiding body, so that the material is not excessively compressed.

A guiding surface reaching to the limiting edge of the support surface located radially outside improves the food discharge through the discharge opening, as in the process a gradually increasing pressure on the material with a component acting towards the container wall is generated.

The flow guiding body can preferably contain one further guiding surface located radially inside and securely retaining the food not pressed to the outside by the first guiding surface in the region of the mixing screw and thus maintaining the mixing performance.

The flow guiding body can furthermore contain a cover surface which only lifts the food sliding onto it from the support surface and thus serves to loosen up the food.

Preferably, both guiding surfaces are combined on one wedge-shaped flow guiding body, where it is decided at the point of the flow guiding body which portion of the food is pressed towards the mixing screw and which portion of the food is pressed towards the container opening.

The plain design of the guiding surface ensures that, though it is essentially directed to the sense of rotation, it generates radially directed components of the power introduction into the food, so that on the one hand the manufacture of the guiding surfaces is facilitated, and on the other hand their effect is increased.

However, it is also possible to design the first guiding surface with a curvature resulting in a particularly smooth handling of the food.

To adapt the system to different mixing tasks and/or different consistencies of the goods to be mixed, the flow guiding bodies can be designed to be adjustable.

The invention is in particular suited for food mixers which are provided not only with the flow guiding body, but also with mixing elements disposed at the periphery of the mixing screw, as both optimally cooperate.

The flow guiding body according to the invention can preferably be manufactured in a constructionally simple manner from a sheet metal blank that is angularly bent.

BRIEF DESCRIPTION OF THE DRAWINGS

The invention will be illustrated below more in detail by means of an embodiment. In the drawings.

DESCRIPTION OF THE PREFERRED EMBODIMENT

FIGS. 1 to 4 show a food mixer 1 which is embodied as food mixing vehicle in the represented embodiment and which can be coupled to a tractor via a tractor hitch 2 and driven in the direction of motion F. A great number of such food mixers is known, for example from EP 1 481 721 reference to which is made herein.

The food mixer 1 contains a container 3 with a side wall 3a and a bottom 3b. The part of the side wall 3a facing the viewer is omitted in FIG. 1 to show the interior. The side wall 3a rises from an essentially circular bottom 3b like a funnel to the top and outwards to form an essentially long-oval cross-section of an upper charging opening 4, the charging opening 4 having a greater area than the bottom 3b.

Figure 1:
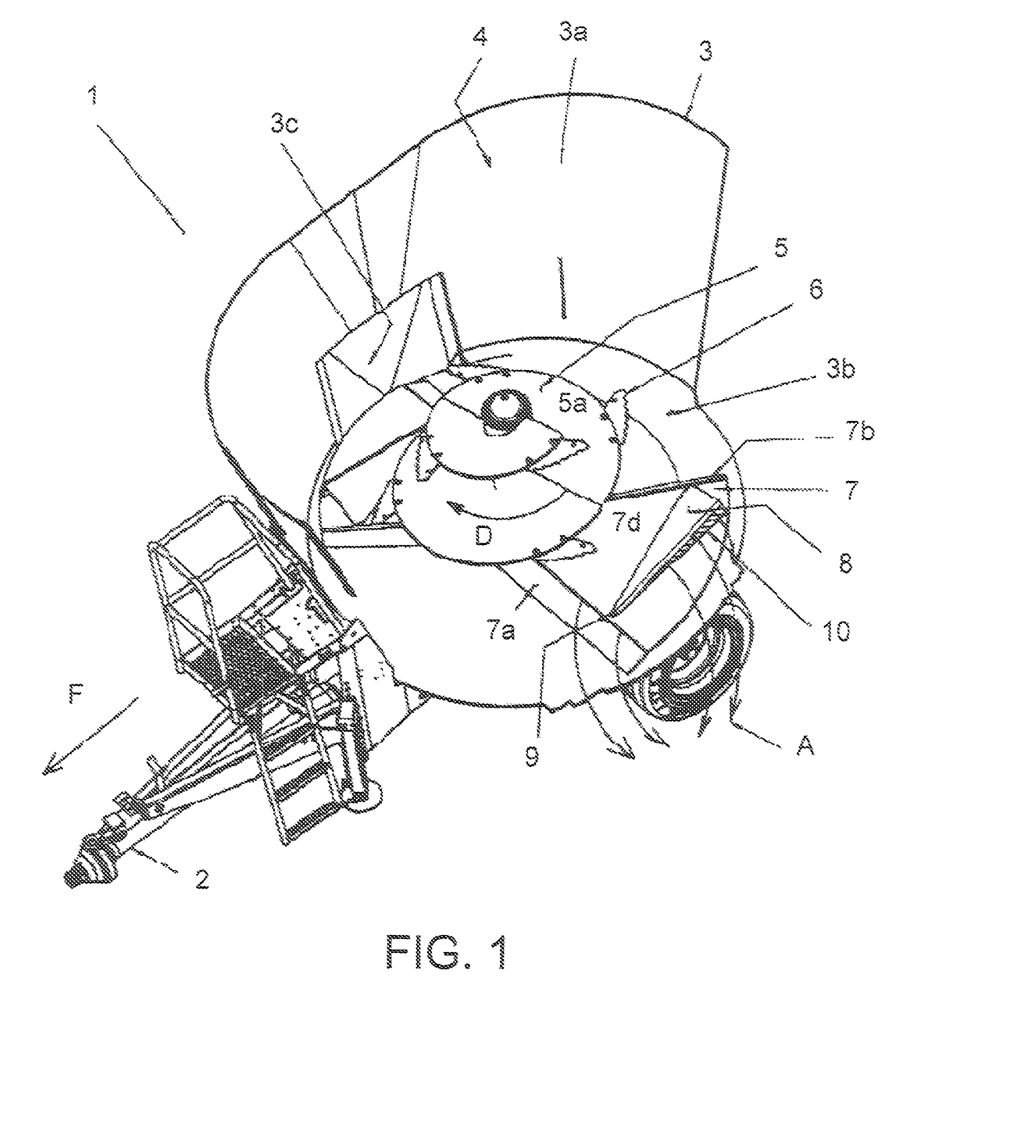
FIG. 1 shows a perspective representation of a food mixer according to the invention.
Figure 2:
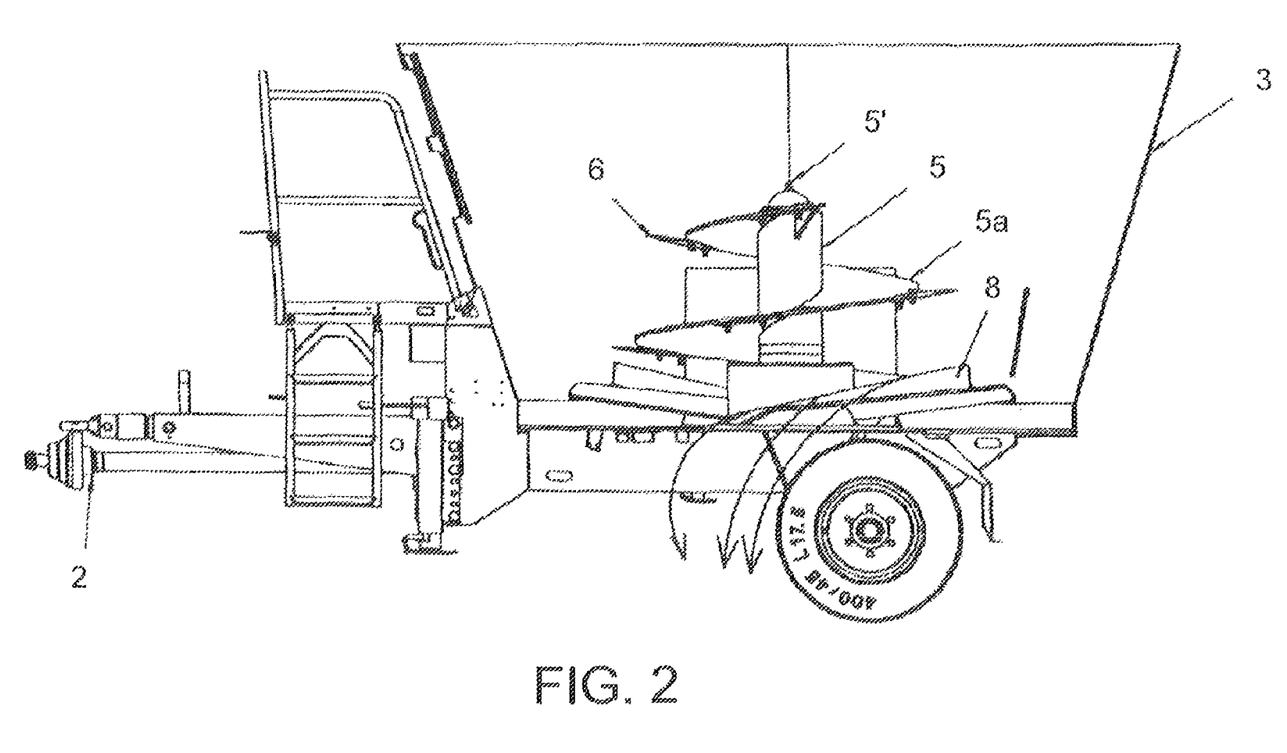
FIG. 2 shows the side view of FIG. 1.
Figure 3:
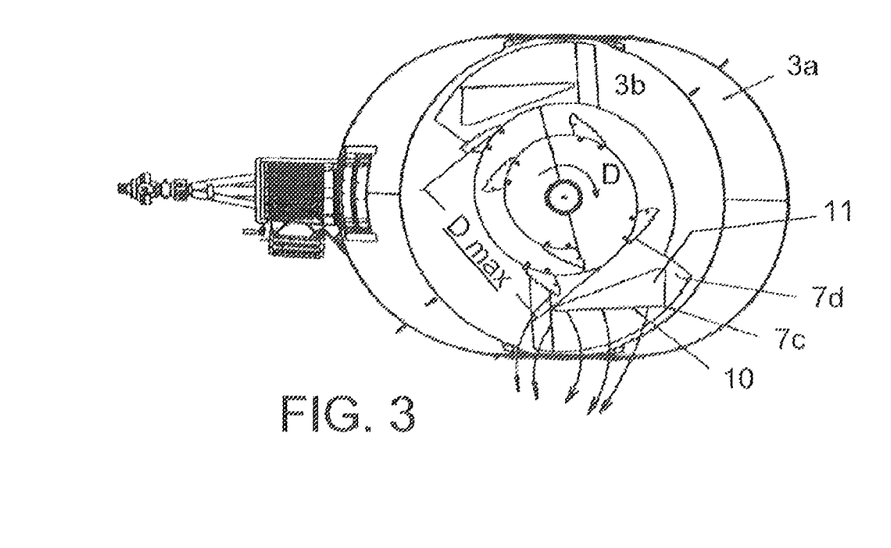
FIG. 3 shows the plan view onto the food mixer according to FIG. 1.
Figure 4:
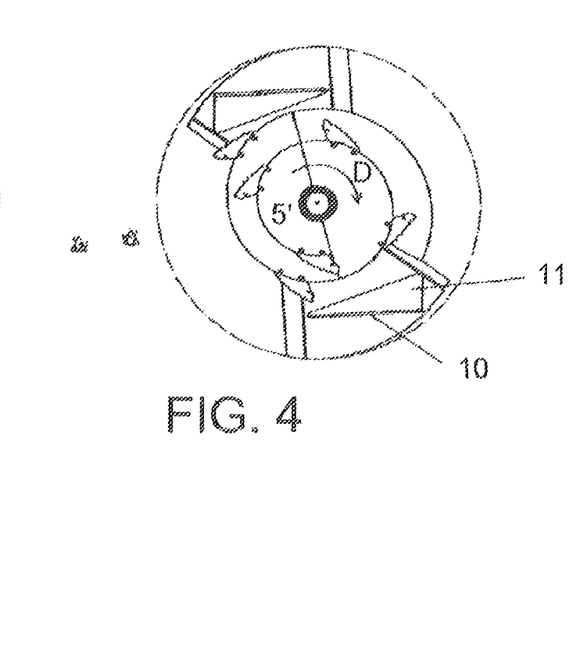
FIG. 4 shows the plan view only onto the bottom of the food mixer according to FIG. 1.

At a suited location, in most cases laterally, seen in the direction of motion F, at least one discharge opening 3c which can be closed by a suited flap or door is provided in the side wall 3a. From this opening 3c, the food introduced into the charging opening 4 is measured out.

One of the common mixing screws 5 which is rotated about a vertical axis 5' in the direction of the arrow D is located inside the container 3. The mixing screw 5 contains one single helix 5a which is wound such that the material is transported from the bottom 3b to the top. The helix 5a is provided at its periphery with cutter elements 6 of a usual construction which project outwards. In the represented embodiment, the maximum diameter $D_{max}$ of the screw 5 is smaller than the diameter of the bottom 3b, and at least one broadening 7 is assigned to the mixing screw 5 which projects below the screw 5 and strokes over the complete diameter of the bottom 3b. In the represented embodiment, the broadening 7 approximately has the shape of a sector or cake slice and contains a leading edge 7a, a trailing edge 7b, a circumferential edge 7c and a support surface 7d open to the top. In the represented embodiment, the broadening 7 is designed as collection plate which is assigned to the beginning of the screw 5 closest to the bottom 3b, and it preferably forms an elongation of this beginning. In the represented embodiment, two essentially diametrically opposite collection plates are provided each with one support surface 7d which have an identical design, so that hereinafter only one of the plates each will be described.

On at least one of the support surfaces 7d, a flow guiding body 8 is provided which projects beyond the support surface 7d and is stationarily fixed in the represented embodiment. The flow guiding body 8 contains a first guiding surface 10 showing with a point 9 to the leading edge 7a and being preferably arranged approx. in the radial center between the mixing screw 5 and the side wall 3a. The point 9 is lying at the leading edge 7a, or it is located at a small distance directly behind the same. The guiding surface 10 starts at the point 9 with a height h=0 above the support surface 7d, extends in the sense of rotation D from the leading edge 7a backwards while it rises, i. e. it has an increasing width leading to an increasing height h above the support surface 7d. The guiding surface 10 is essentially triangular and stands essentially upright on the support surface 7d. The term "essentially upright" is to include a perpendicular course of the guiding surface 10 at an angle of 90°, however it also includes arrangements inclined slightly towards the axis of revolution or away from the same, which, however, do not hinder the intended purpose. In the represented embodiment, the guiding surface 10 joins the essentially radially extending edge 7a essentially perpendicularly; depending on the angular position of the edge 7a with respect to the radius of the screw 5, however, other angles can also result. The smallest distance between the guiding surface 10 and the axis 5' is at its point 9, the distance broadening backwards, i.e. opposite to the sense of rotation, and preferably extending from the leading edge 7a to the radially outer circumferential edge 7c. The guiding surface 10 is preferably a plane surface.

The flow guiding body 8 contains a second guiding surface 11 which is also plain and triangular, starts at the point 9 and broadens to the back, i.e. opposite to the sense of rotation D. The second guiding surface 11 faces the axis of revolution 5' and is inclined from radially inside to radially outside with respect to the support surface 7d; preferably at an angle of between about 10 to 60°, particularly preferred 25°. Furthermore, the second guiding surface 11 is disposed such that it extends essentially tangentially to the axis of revolution 5'.

Figure 5:
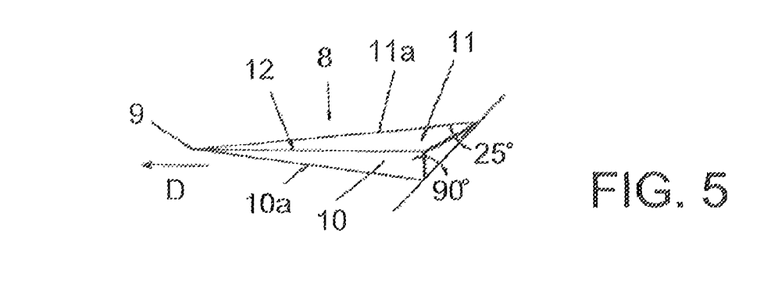
FIG. 5 shows a perspective representation of a flow guiding body.

As is shown in particular in FIG. 5, the flow guiding body is wedge-shaped, the two guiding surfaces 10, 11 each comprising a base line 10a, 11a and converging in a common apex line 12. The base lines 10a, 11a, and the apex line 12 converge in the point 9. The flow guiding body 8 thus has a cross-section that is embodied triangularly and is enlarged from the point 9 opposite to the sense of rotation D to the back, and it comprises a longitudinal section that is also triangular and first enlarges from a base line 10a up to the apex line 12, and is reduced again from the apex line 12 to the opposite base line 10a.

As is shown in FIG. 5, the flow guiding body 8 can be angularly bent from a sheet metal blank in a simple manner.

Figure 6:
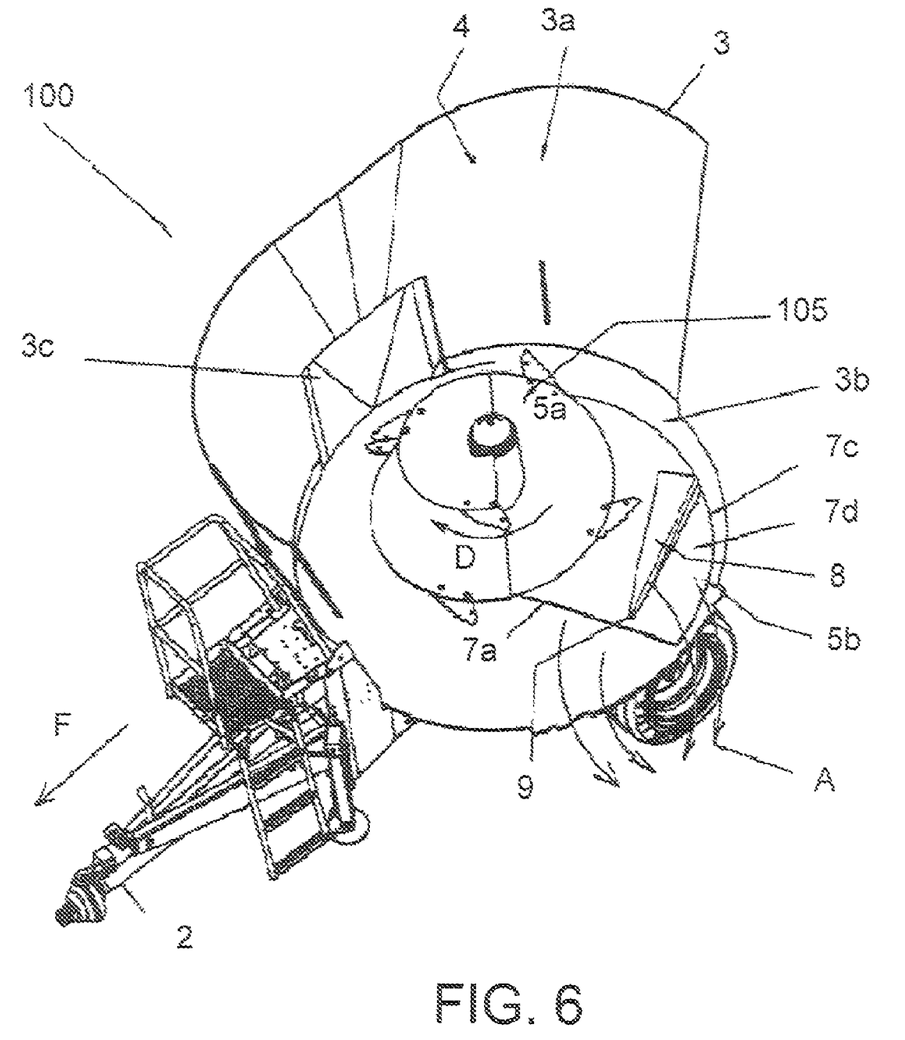
FIG. 6 shows a view similar to FIG. 1 of a further embodiment of a food mixer according to the invention.

FIG. 6 shows a further embodiment 100 of a food mixer according to the invention which corresponds to the food mixer according to FIG. 1 except for the details described below. Identical or comparable components have been designated with the same reference numerals and won't be explained again.

The food mixer 100 differs from the food mixer 1 by a mixing screw 105 with a modified design. The mixing screw 105 is provided with a broadening of its helix at its lowermost area. However, the broadened lowermost area 5b of the helix, too, contains the leading edge 7a, the circumferential edge 7c, the support surface 7d. However, the mixing screw 105 is only provided with one broadening 5b and thus only contains one flow guiding body 8. The broadened lowermost area 5b, too, strokes over the complete diameter of the bottom 3b with its leading edge 7a.

In the embodiments described up to now, the flow guiding body 8 or flow guiding bodies is/are stationarily connected to the support surface 7d. However, it is also possible to embody the flow guiding body 8 so as to be adjustable. Examples of adjustable flow guiding bodies can be taken from FIGS. 7 and 8.

Figure 7:
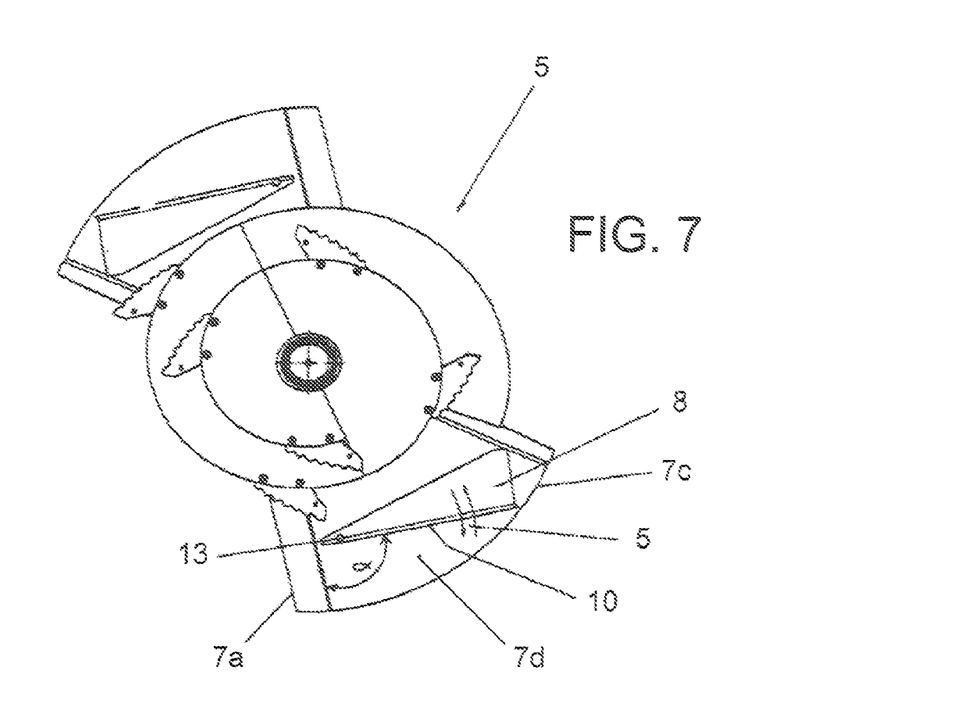
FIG. 7 shows a plan view onto a mixing screw with an adjustable flow guiding body.

FIG. 7 shows, with reference to the food mixer 1 of FIG. 1, a guiding body 8 that is fixed on the support surface 7d of a receiving plate 7 so as to pivot. In this embodiment, the guiding body 8 is an axis of revolution 13 vertically standing on the support surface 7d pivoting in the direction of the arrows S, so that the angle α the guiding surface 10 includes with the leading edge 7a can be changed. In the represented embodiment, this angle α is, as in the embodiments described up to now, 90°±10°, but it can also be adjusted to other angles if the type of material to be treated requires this.

Figure 8:
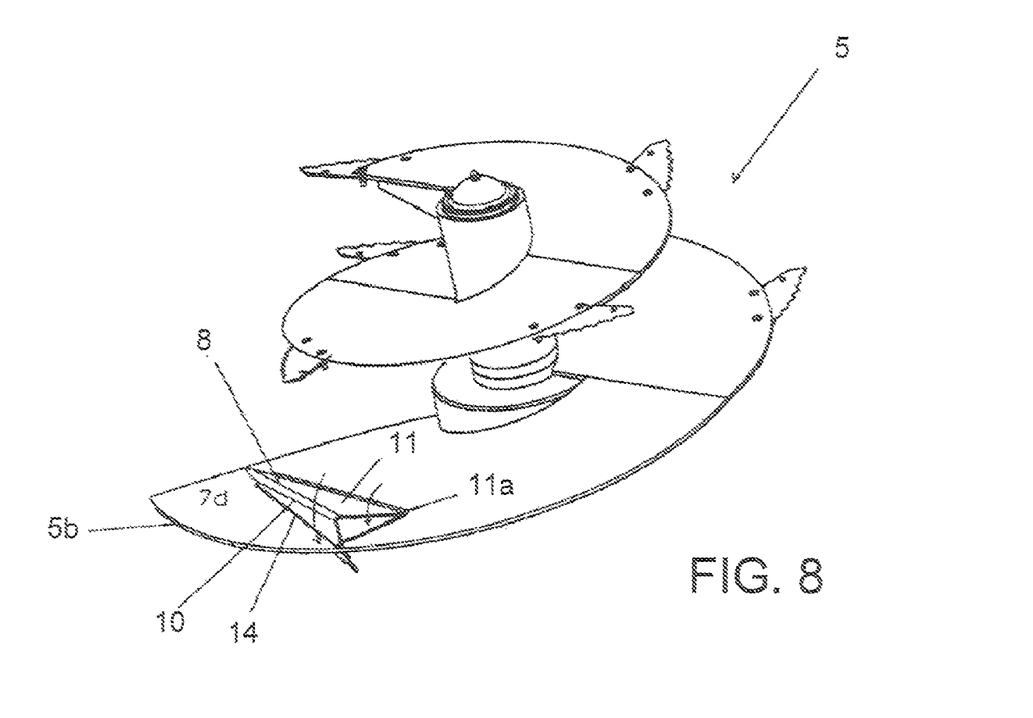
FIG. 8 shows a perspective representation of a mixing screw with an adjustable flow guiding body.

FIG. 8 shows a mixing screw 5 with a broadened lower area 5b with a flow guiding body 8 of which the height above the support surface 7d can be adjusted in the direction of the arrows H. To this end, the flow guiding body 8 or at least the guiding surface 10 submerges into an opening 14 in the support surface 7d and can be fixed there in a position that corresponds to the desired height of the flow body 8, i.e. its projection beyond the support surface 7d. The complete flow guiding body can be adjusted to be located inside or outside the opening 14, however, the flow guiding body 8 can also be provided with a joint, preferably along the base line 11a, and be pivoted about this joint such that the guiding surface 10 submerges more or less deep into the opening 14.

It is furthermore possible to employ flow guiding bodies of a multitude of designs, wherein, however, as a common essential feature, the height of the flow guiding body starting at 0 should be located at the point closest to the leading edge 7a.

Figure 9:
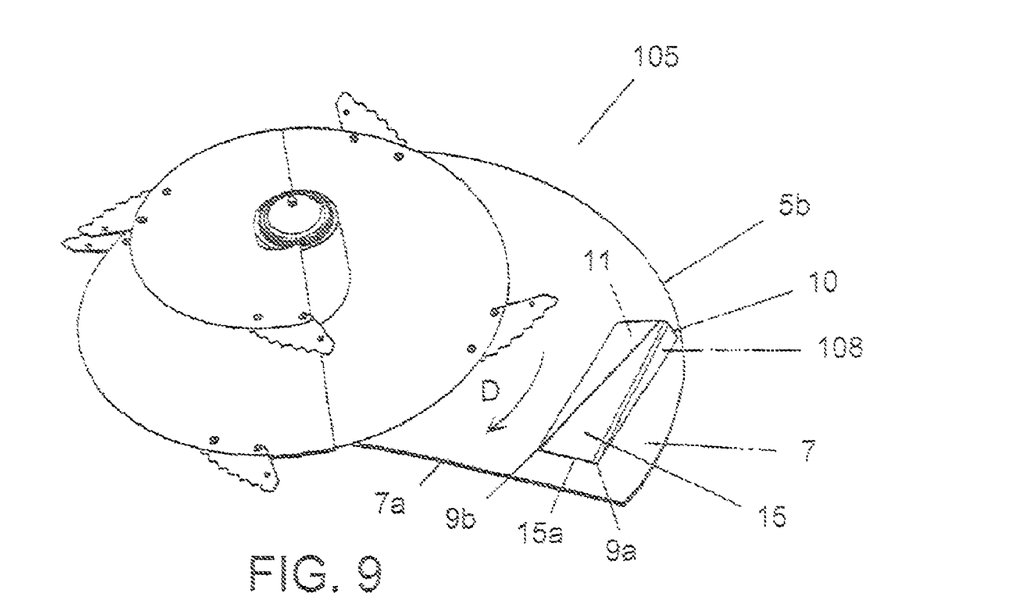
FIG. 9 shows a perspective representation of a mixing screw with a modified flow guiding body.
Figure 10:
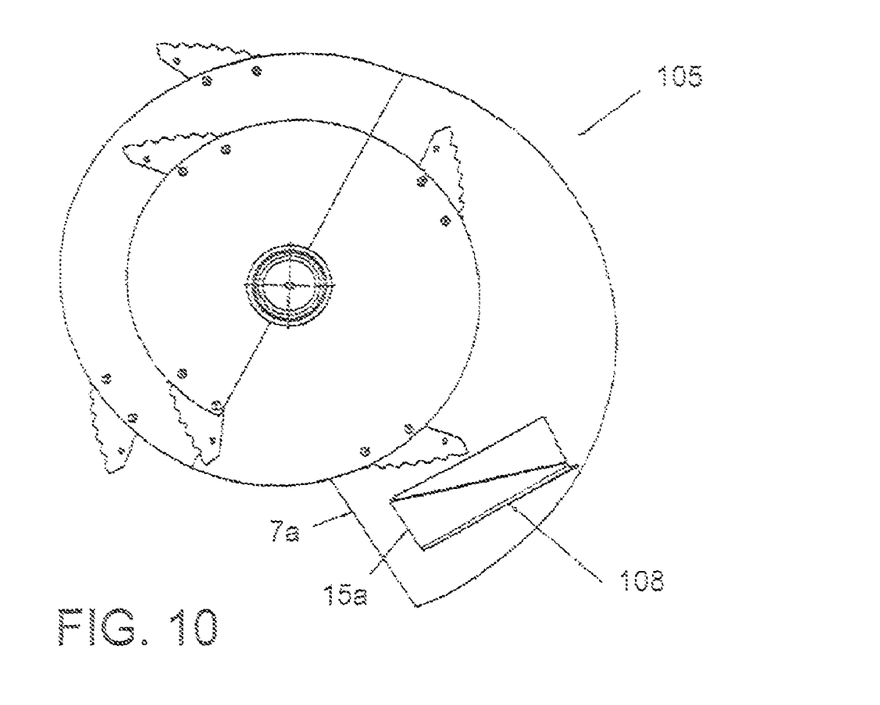
FIG. 10 shows the plan view onto FIG. 9.

The embodiment of FIGS. 9 and 10 is based on the mixing screw 105 with a broadened lower area 5b and contains a flow guiding body 108 containing the guiding surfaces 10 and 11 which are essentially embodied as in the previous embodiment, which are, however, assembled to form a rectangular plan. The two guiding surfaces 10 and 11 are connected to each other via a cover surface 15 which has a triangular design and comprises a base line 15a which is lying flat on the support surface 7d leading in the sense of rotation D and thus forms a vertex line 15a. The line 15a has a height 0 above the support surface 7d and connects a point 9a of the guiding surface 10 with a point 9b of the guiding surface 11. If the leading edge 7a extends radially, the vertex line 15a extends essentially in parallel to the leading edge 7a, while the arrangement of the guiding surface 10 corresponds to the arrangement of the guiding surface 10 in the flow body 8.

Figure 11:
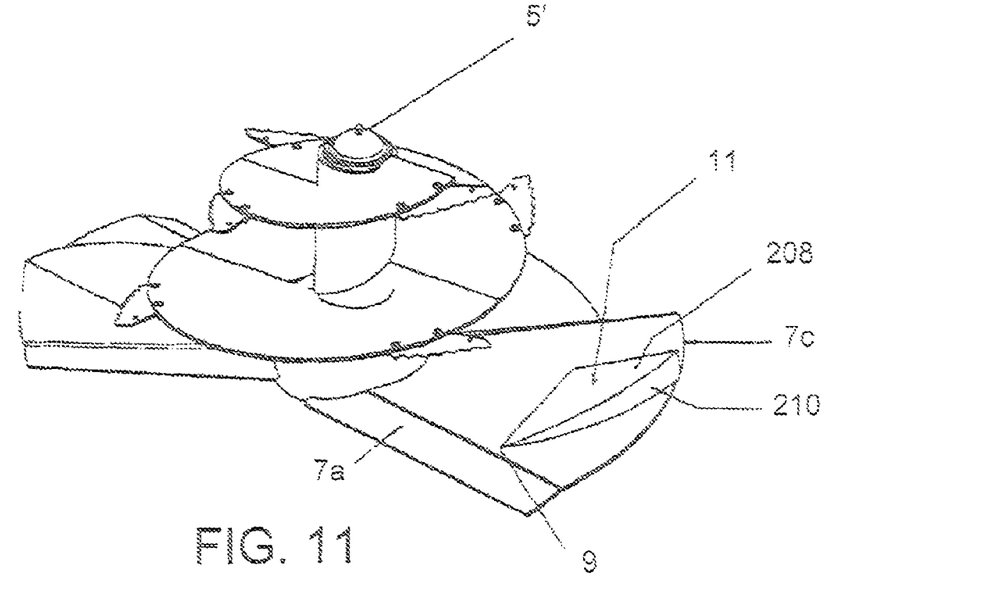
FIG. 11 shows a perspective representation of a mixing screw with a modified flow guiding body.

FIG. 11 shows another flow guiding body 208 differing from the flow guiding body 8 or 108, respectively, by a curved flow guiding surface 210 located radially outside. The flow guiding surface 210 is curved, the curvature facing outwards. The radius of curvature of the guiding surface 210 can be larger or smaller than the radius of the mixing screw 5. Apart from other constructional dimensions, for example a guiding surface 11 extremely broadened in its trailing area, the arrangement and embodiment of the flow guiding body 208 analogously correspond to those of the flow guiding body 8.

Figure 12:
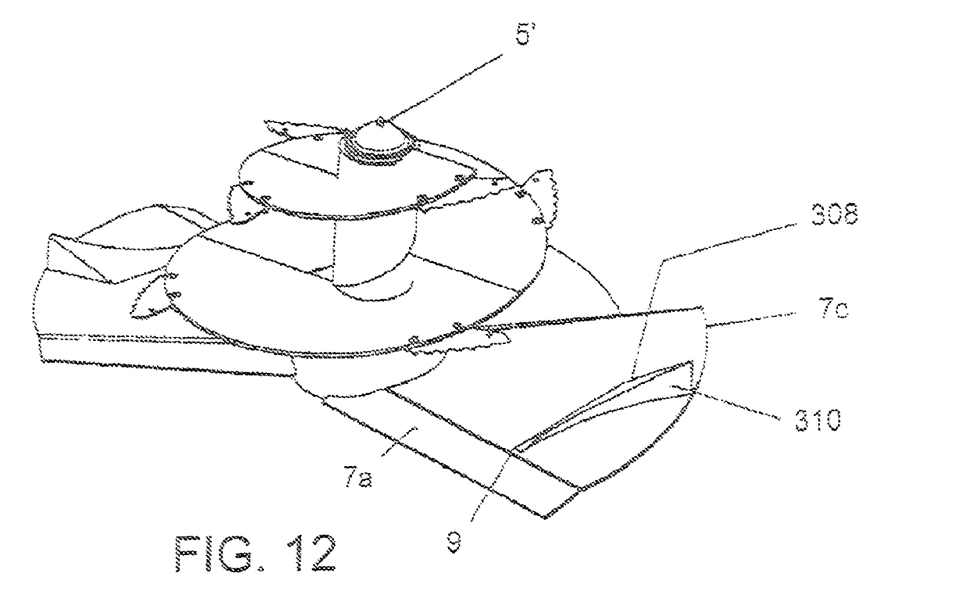
FIG. 12 shows a perspective representation with a modified flow guiding body.

FIG. 12 shows a further embodiment of a flow guiding body 208 differing from the flow guiding body 8 by a curved guiding surface 310 located radially outside. In contrast to the guiding surface 210, however, the guiding surface 310 is curved to the inside, i.e. towards the axis of revolution 5'. The radius of curvature should again be selected such that the point 9 joins the leading edge 7a and the rear area ends at the circumferential edge 7c.

Figure 13:
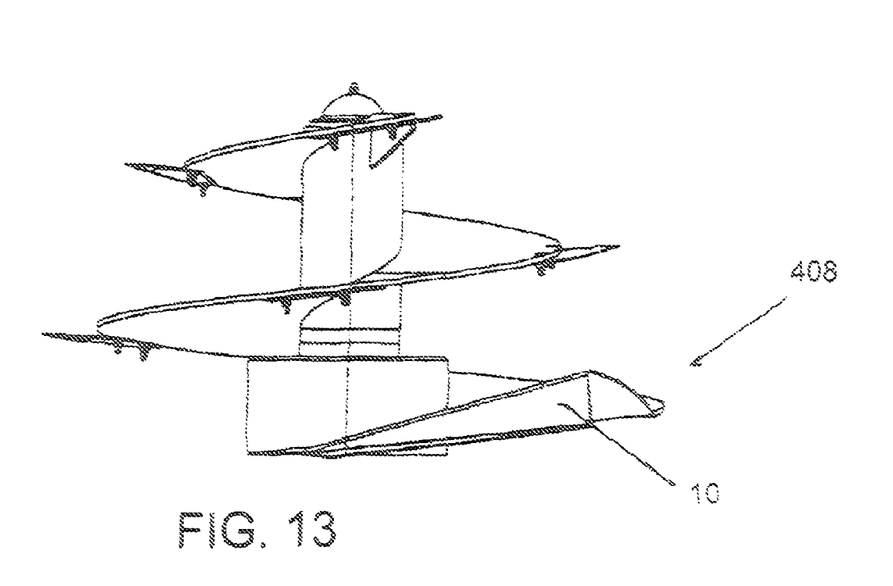
FIG. 13 shows a front view of a mixing screw with a modified flow guiding body.
Figure 14:
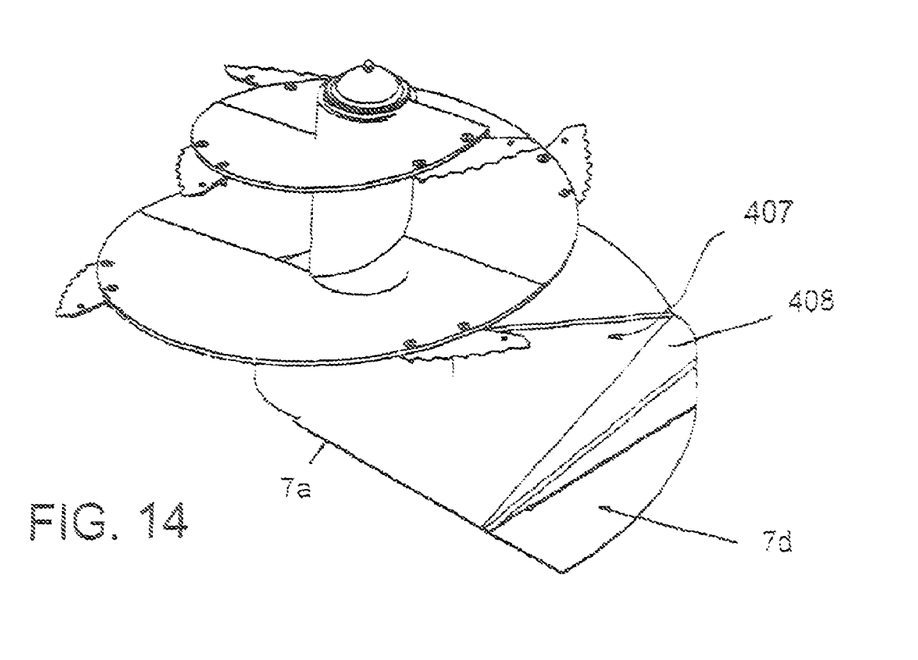
FIG. 14 shows a perspective representation of the mixing screw according to FIG. 13.

FIGS. 13 and 14 show another embodiment of a flow guiding body 408 differing from the flow guiding body 8 only by its integral manufacture with a broadening, be it the collection plate 7 or the broadened area 5b, or, as represented, an extension plate 407. The flow guiding body 408 is generated by a triangular folding of the broadening, the folding again projecting beyond the support surface 7d. The shape and arrangement as well as the general dimensions approximately correspond to those of the flow guiding body 8.

In the operation of the food mixer 1 according to the invention, the food is filled into the container 3 through the charging opening 4 and falls down onto the bottom 3b. The mixing screw 5 is driven in the sense of rotation D and also moves the support surface(s) 7d in the sense of rotation D. The leading edge 7a of the support surface 7d grips under the food lying on the bottom 3b and lifts the same onto the support surface 7d. There, the leading area (point 9 or vertex line 15a) of the flow guiding body penetrates the food and lifts the same. At the same time, the first flow guiding surface 10 generates a component directed radially to the outside which presses the food radially outside, as indicated by arrows A. At the same time, the food is guided by the second guiding surface 11 towards the mixing screw 5, conveyed vertically upwards by the mixing screw 5 and falls again downwards from the top, so that a downward flow along the side wall 3a of the container 3 results. The component A directed to the outside counteracts this downward movement, however not strong enough to prevent the downward movement. However, the flow A is strong enough to ensure a uniform measuring out through the opening 5 as soon as the same is opened.

In modification of the described and drawn embodiments, the details of the various figures can be interchanged. The flow guiding body can also possibly only contain the first guiding surface located radially outside. The two guiding surfaces can also have the same size and possibly be also arranged with the same inclination to the support surface. The invention can furthermore be employed in all mixers of the known type and for very different designs of the mixing screw (cylindrical or conical or the like).

The invention claimed is:

1. Food mixer with a container having a side wall and a bottom, a mixing screw rotating about an axis extending essentially perpendicular to the bottom, and with a support surface assigned to the mixing screw that strokes over the bottom with a leading edge and from which a flow guiding body projects upwards, the flow guiding body comprising a point and a guiding surface facing essentially radially outwardly with respect to the axis and the point being directed to the leading edge and resting on the support surface and the flow guiding body extending in the sense of rotation backwards with an increasing height above the support surface.

2. Food mixer according to claim 1, wherein the smallest distance between the guiding surface and the axis is at the point.

3. Food mixer according to claim 1, wherein the guiding surface essentially points to the center of the leading edge.

4. Food mixer according to claim 1, wherein the guiding surface reaches from the leading edge essentially to a limiting edge of the support surface located radially outside.

5. Food mixer according to claim 1, wherein the flow guiding body comprises another guiding surface defined by a base and apex lines converging in a point, faces the axis of revolution, is inclined with respect to the axis radially and diagonally outwards, extends in the sense of rotation backwards and comprises a height increasing from the point to the back.

6. Food mixer according to claim 1, wherein the flow guiding body comprises a cover surface extending in the sense of rotation backwards from a vertex edge resting on the support surface and with an increasing height above the support surface.

7. Food mixer according to claim 1, wherein the flow guiding body has a wedge-shaped design, comprises a first and a second essentially triangular guiding surface converging in a point directed to the leading edge, wherein the radially outer guiding surface is standing essentially upright on the support surface and the radially inner guiding surface is radially inclined from the bottom inside to the top outside.

8. Food mixer according to claim 1, wherein the cross-sectional area of the flow guiding body increases as the distance from the point to the back increases and is radially reduced to the inside as the distance from the guiding surface increases.

9. Food mixer according to claim 1, wherein the guiding surface essentially extends plainly.

10. Food mixer according to claim 1, wherein the guiding surface essentially extends in a curved manner.

11. Food mixer according to claim 1, wherein the flow guiding body is adjustable.

12. Food mixer according to claim 1, wherein the flow guiding body is integrally embodied with the support surface and is shaped out of the support surface.

13. Food mixer according to claim 1, wherein the mixing screw is provided with cutter elements arranged at the periphery.

14. Food mixer according to claim 1, wherein the support surface with the flow guiding body projects from under the mixing screw.

* * * * *

UNITED STATES PATENT AND TRADEMARK OFFICE
CERTIFICATE OF CORRECTION

| | |
|---|---|
| PATENT NO. | : 7,938,575 B2 |
| APPLICATION NO. | : 12/435704 |
| DATED | : May 10, 2011 |
| INVENTOR(S) | : Cornelis Hendricus Liet |

It is certified that error appears in the above-identified patent and that said Letters Patent is hereby corrected as shown below:

ON THE TITLE PAGE:

Item (73) Assignee: - delete "Trioliet Mullos B.V.8" and insert -- Trioliet Mullos B.V. --

Signed and Sealed this
Second Day of August, 2011

David J. Kappos
*Director of the United States Patent and Trademark Office*